Aug. 23, 1966  W. C. WALKER  3,268,076
APPARATUS FOR CLEANING SEEDS
Filed May 22, 1963  3 Sheets-Sheet 1

INVENTOR:
William C. Walker
BY
Richards & Geier
ATTORNEYS

Aug. 23, 1966  W. C. WALKER  3,268,076
APPARATUS FOR CLEANING SEEDS
Filed May 22, 1963  3 Sheets-Sheet 2

INVENTOR:
W. C. Walker
BY Richards + Geier
ATTORNEYS

United States Patent Office 3,268,076
Patented August 23, 1966

3,268,076
APPARATUS FOR CLEANING SEEDS
William Charles Walker, The Brae, Cracow,
Queensland, Australia
Filed May 22, 1963, Ser. No. 282,387
Claims priority, application Australia, May 29, 1962,
18,277/62
4 Claims. (Cl. 209—250)

This invention relates to new and improved apparatus for cleaning seeds.

Certain kinds of seed, such as that of buffel grass, is difficult to obtain in a clean condition as, being of a hairy nature, the seed when harvested mechanically tends to adhere to pieces of stalk and leaf and other foreign matter, which may include certain weed seeds. Consequently, hand-harvested seed, generally free from such foreign matter, is more highly valued and considerably higher priced, then seed harvested by mechanical harvesters hitherto used.

One of the main objects of the present invention is to provide apparatus capable of cleaning seed such as buffel grass seed by separating foreign matter from the seed. Other objects of the invention are to provide such apparatus which is simple and economical to manufacture and to operate, which is capable of cleaning seed rapidly and efficiently, and which is trouble-free in operation and sturdy and durable in use.

With the foregoing and other objects in view, the invention resides broadly in apparatus for cleaning seeds, including an air conduit, a receptacle, means for directing an airstream through said conduit towards said receptacle, feeding means to feed seed to be cleaned to said airstream, two parallel flat perforated screens spaced from said conduit and intercepting said airstream between said conduit and said receptacle, and means for rotating said screens in opposite directions. Preferably the seed may be fed to the airstream from a hopper at a controlled rate. Preferably, too, the receptacle is in the nature of a sieve, adapted to hold the seed being cleaned, but to permit smaller weed seeds and the like to fall therethrough, and means may be provided for vibrating this receptacle. Other features of the invention will become apparent from the following description.

Figure 1:
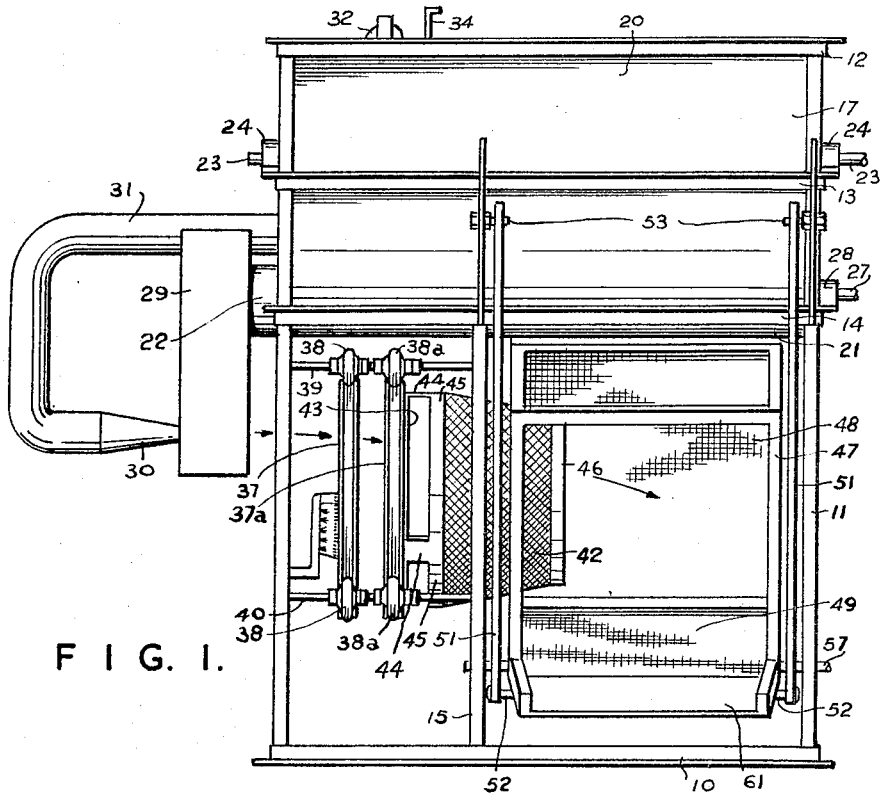
Figure 2:
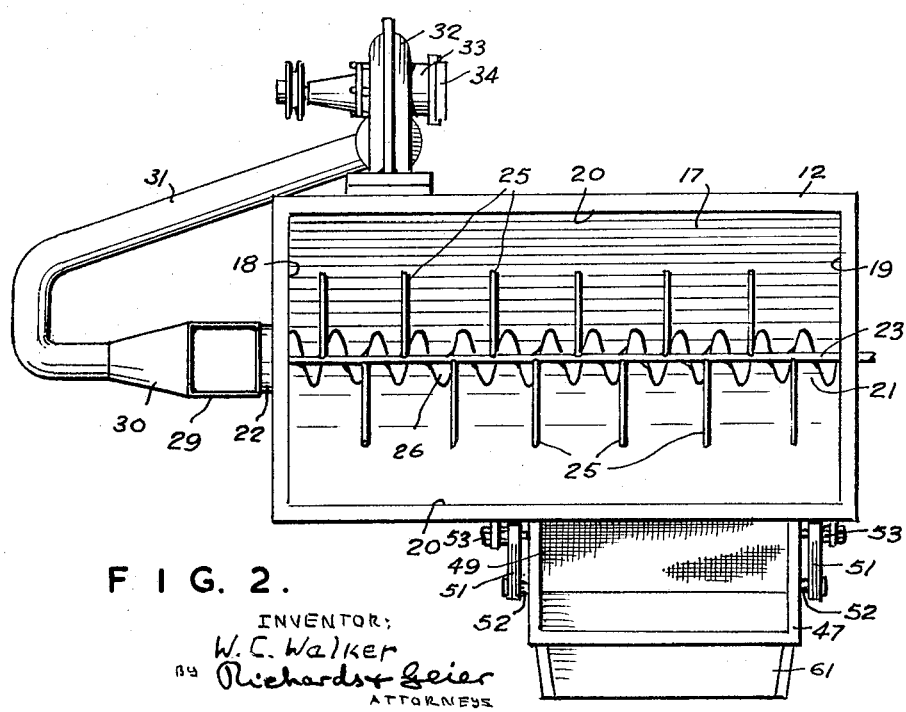
Figure 3:
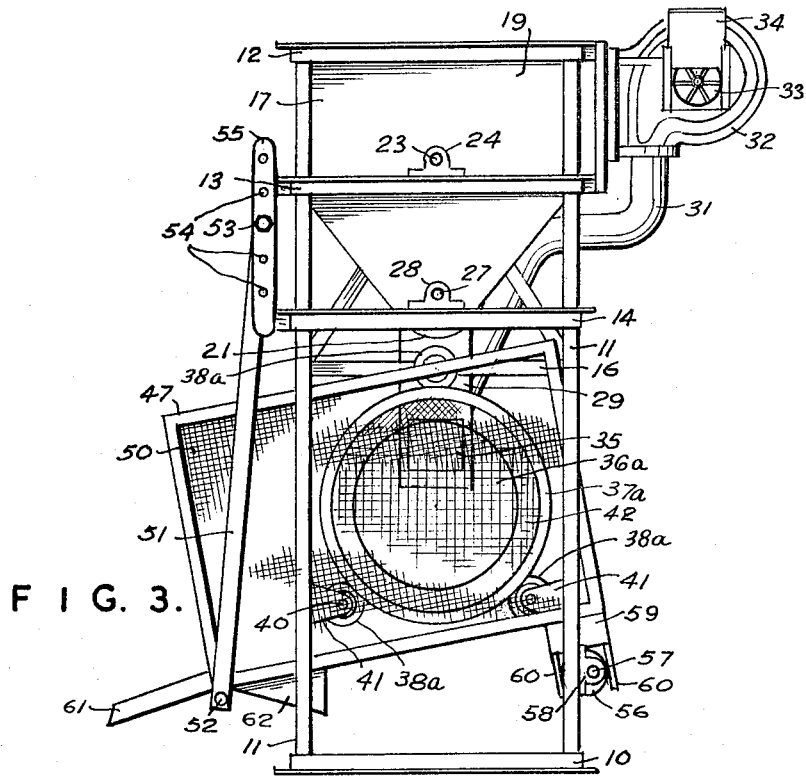
Figure 4:
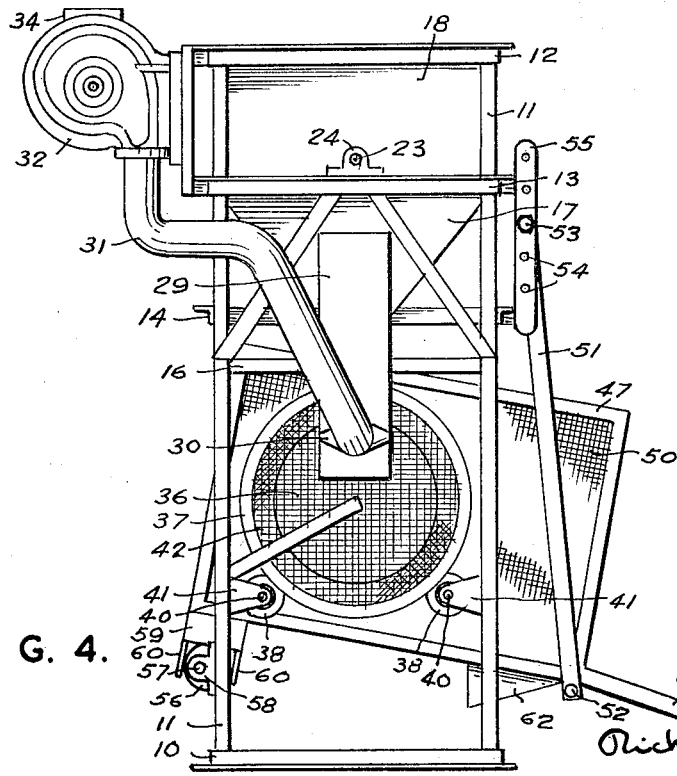

In order that a preferred embodiment of the invention may be readily understood and carried into practical effect, reference is now made to the accompanying drawings, wherein:

FIG. 1 is a side elevational view of a seed cleaning device according to the invention, FIG. 2 is a partly broken-away plan view of the apparatus, FIG. 3 is a rear elevational view of the seed cleaner, and FIG. 4 is a partly broken-away front view of the device.

While the seed cleaning device shown in the drawings is devised particularly for the cleaning of buffle grass seed, it has been shown to work with other types of seed. It includes a rectangular main frame principally of angle-iron members welded together to form a rectangular base 10 from the corners of which uprights 11 extend vertically, being rigidly interconnected at the top by a rectangular top frame 12 and, some distance therebelow, a further rectangular frame 13. Below the frame 13, the uprights have secured thereto another frame 14 consisting of a rear member and two side members only, and intermediate uprights 15 are secured between the side members of this frame and/or the base 10. Transverse members 16 interconnect the two front uprights 11 and the two intermediate uprights 15, below the level of the frame 14.

The main frame supports a hopper 17 of sheet metal, having parallel front 18 and back 19, and sides 20 which, between the top frame 12 and the frame 13 are parallel, and which therebelow are downwardly convergent to an arcuate-section bottom 21. From the lower part of the hopper front 18, there extends forwardly a short cylindrical outlet 22, co-axial with the curved bottom 21 of the hopper.

An agitator shaft 23 is rotatably mounted in bearings 24 secured centrally on the ends of the frame 13, and within the hopper a number of agitator arms 25 extend in opposite directions from this shaft. The agitator shaft may be rotated from a suitable motor (not shown) mounted on the main frame by means of a suitable drive, such as a belt and pulley drive (not shown).

Within the lower part of the hopper 17, and extending into the outlet 22 therefrom is a helical feed screw 26, made of sheet metal and mounted on a feed screw shaft 27 which is rotatable at one end in a bearing 28 mounted centrally on the rear member of the frame 14. The feed screw shaft 27 may be rotated from the motor by means of a belt and pulley drive (not shown).

Buffle grass seed to be cleaned may be introduced into the hopper 17, and fed through the outlet 22 therefrom at a controlled rate by the rotating feed screw 26, the seed within the hopper being kept agitated, and so fed regularly to the feed screw, by the rotating agitator arms 25.

Seed fed from the hopper outlet 22 is delivered into an upright delivery chute 29 to descend gravitationally therethrough. Seed passing down the chute is acted upon by a fairly strong airstream from an air nozzle 30 leading in through the front of the said chute, this nozzle being connected by a conduit 31 to the outlet of a blower 32 mounted on the upper part of one side of the main frame, and driven by a suitable drive (not shown) from the motor. The inlet 33 of the blower 32 is fitted with an adjustable damper device in the form of a sliding shutter 34 so that the airstream through the nozzle 30 may be regulated.

Seed and associated foreign matter descending the delivery chute 29 and acted on by the airstream from the nozzle 30 is directed through an opening 35 in the rear of the said chute, and is thus impelled rearwardly to a rotating screen 36. This screen, which may suitably be a disc of wire mesh, is mounted within a grooved rim 37 supported vertically by three small rubber or like wheels 38, one rotatably mounted on a top shaft 39 itself rotatable in bearings (not shown) in the two transverse members 16, the other two on bottom shafts 40 rotatable in bearings in bearing brackets 41 carried by the front uprights 11 and intermediate uprights 15. One wheel on a shaft 40 is fixed thereto, and screen 36 may be rotated by a suitable drive (not shown) from the motor to this shaft 40. The screen 36 is so arranged that seed and other matter impelled by the air blast will be directed to the upper part of the screen, the direction of travel of the seed being indicated by arrows in FIG. 1. In traversing the space between nozzle 30 and screen 36, the seed and trash spreads to cover a considerable area of screen 36, with more effective screening.

Mounted parallel and close to screen 36 is a second screen 36a in rim 37a of similar construction and mounted for rotation on wheels 38a similar to wheels 38. However, wheel 38a on shaft 39 is fixed to that shaft, and wheels 38a on the other two shafts are freely rotating. Shaft 39 is driven (by means not shown) to rotate screen 36a oppositely to screen 36.

Mounted behind and rotatable with the screen 36a is a guide cone 42, spaced behind, and co-axial with, the screen rim 37a. A sheet metal ring 43, secured to the rim 37a, is connected by parallel longitudinal arms 44 to a ring 45 to which the front of the guide cone, made of mesh, is secured, the rear of the guide cone being secured about a smaller rear ring 46.

The rear part of the guide cone 42 extends into the front of a vibratory receptacle 47, consisting of a rectangular box-like metal frame open at the front, the top and one side, the back, the bottom and the other side being fitted with mesh panels indicated respectively at 48, 49 and 50. The receptacle 47 is tilted, so that its mesh bottom 49 is inclined downwardly towards the open side of the receptacle. The open side of the receptacle is supported in oscillatory manner by a pair of arms 51 connected at their lower ends to pivots 52 extending to either side of the bottom of the open side of the receptacle, and at their upper ends engaged by pivots 53, secured in selected corresponding holes of series of holes 54 in a pair of upright plates 55 secured to one side of the two frames 13 and 14. The closed side of the receptacle 47 is supported by a pair of eccentrics or cams 56 mounted on a longitudinal cam shaft 57 carried by bearings 58 on a rear upright 11 and an intermediate upright 15, the cams bearing under a pair of bearers 59 secured under the closed side of the receptacle. A pair of pins 60 extend downwardly from each of the bearers 59 to contact either side of the appropriate eccentric so that, when the cam shaft 57 is rotated, by means of a suitable drive (not shown) from the motor, a reciprocating vibratory motion is imparted to the receptacle.

The tilted mesh bottom 49 of the receptacle leads to a shallow seed discharge chute 61. Under the part of the mesh bottom 49 near to this chute 61, a deflector chute 62 is mounted, inclining downwardly in the direction opposite to that of the seed discharge chute.

When buffel grass seed, together with straw, leaves and other foreign matter, is impelled by the air blast to the upper part of the rotating screen 36, as before described, nearly all of the straw, leaves and the like is caught by the screen, and nearly all of the buffel grass seed passes through the screen, being guided, as indicated by the arrows in FIG. 1, to screen 36a and thence through the guide cone 42 and into the vibratory receptacle 47, the mesh back panel 50 intercepting such seeds as do not fall directly to the mesh bottom 49. As the screens 36 and 36a rotate, foreign matter held thereto by the air blast is carried clear of the air blast, and most of its falls off the screen. Remaining foreign matter is cleaned from screen 36, as it rotates, by a fixed brush 63 mounted more or less radially across the front of the lower part of the screen. Since brush 63 is outside the airstream, foreign matter is not held to screen 36 by air pressure and brush 63 may remove it much more easily than with a brush situated in the airstream.

Small weed seeds may be carried, with the buffel grass seed through the screens 36 and 36a and into the vibratory receptacle. Many such weed seeds will pass through the mesh back 50 of this receptacle, others will fall onto the mesh bottom 49, with the buffel seed. As the receptacle is vibrated, the buffel seeds are gradually moved over the mesh bottom to the discharge chute 61, and in the course of this, practically all of the remaining weed seeds will fall through the mesh bottom. The cleaned buffel grass seed is fed from the seed discharge chute 61 into a suitable container (not shown), the deflector chute 62 acting to separate from the buffel seeds any weed seeds that may fall through the lower part of the mesh bottom.

If the weed seeds are not numerous, the vibratory receptacle may be adjusted, by lowering the top pivots 53 of the oscillating arms 51, so that the cleaned seed will be delivered at a faster rate; and if the weed seeds are numerous, the tilt of the receptacle bottom may be decreased by raising these pivots.

Seed cleaning apparatus as described and illustrated has been found to be very effective in removing nearly all of the foreign matter from machine-harvested buffel seed. The provision of the second screen 36a rotating oppositely to screen 36, allows material temporarily caught on screen 36 to be carried across the air blast in one direction and then, on finally reaching screen 36a, to be taken back across the air blast in the opposite direction. This is found to give much more effective screening.

The apparatus described herein may be used for the cleaning of other seed than that of buffel grass, and it may be subject to many minor modifications of constructional detail and design without departing from the invention as defined by the claims.

What I claim is:

1. Apparatus for cleaning seeds including an air conduit, a receptacle, a nozzle for directing an airstream from said conduit towards said receptacle, feeding means to feed said seed to be cleaned into said airstream, a first and a second substantially flat perforated screen parallel to each other and spaced from said nozzle to intercept said airstream between said conduit and said receptacle, each said screen being rotatable in its own plane about an axis displaced from said airstream, and means for rotating said screens in opposite directions, said first screen being nearer said nozzle than said second screen, and a fixed brush contacting that side of said first screen nearer said nozzle, said brush being positioned out of said airstream.

2. Apparatus as claimed in claim 1, in which the bottom and that side of said receptacle remote from said screens are perforated.

3. Apparatus as claimed in claim 2, including means for vibrating said receptacle.

4. Apparatus as claimed in claim 3, including means for tilting said receptacle and means for securing said receptacle at a predetermined tilted position.

References Cited by the Examiner

UNITED STATES PATENTS

| | | | |
|---|---|---|---|
| 484,306 | 10/1892 | Faist | 209—332 X |
| 523,335 | 7/1894 | Dodge | 209—25 |
| 1,085,824 | 2/1914 | Root | 209—302 |
| 1,235,157 | 7/1917 | Peters | 209—284 |
| 1,313,729 | 8/1919 | Parsons | 209—245 |
| 1,479,904 | 1/1924 | Falker | 209—332 |
| 2,772,445 | 12/1956 | Hubbard | 209—250 |
| 3,089,592 | 5/1963 | Gage | 209—291 |

FOREIGN PATENTS

| | | |
|---|---|---|
| 656,567 | 3/1932 | Germany. |

HARRY B. THORNTON, *Primary Examiner.*

R. HALPER, *Assistant Examiner.*